(12) United States Patent
Bartley et al.

(10) Patent No.: US 7,596,617 B2
(45) Date of Patent: *Sep. 29, 2009

(54) APPARATUS, METHOD, AND BUSINESS METHOD FOR ENABLING CUSTOMER ACCESS TO COMPUTER SYSTEM EXECUTION DATA IN EXCHANGE FOR SHARING THE EXECUTION DATA

(75) Inventors: Royan Herbert Bartley, Rochester, MN (US); Michael John Branson, Rochester, MN (US); Steven Gene Halverson, Rochester, MN (US); David Alan Jaeger, Red Wing, MN (US); Todd Mark Kelsey, Rochester, MN (US); Paul William Wertzler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1839 days.

This patent is subject to a terminal disclaimer.

(21) Appl. No.: 09/892,435

(22) Filed: Jun. 27, 2001

(65) Prior Publication Data

US 2003/0005075 A1 Jan. 2, 2003

(51) Int. Cl.
*G06F 15/173* (2006.01)
(52) U.S. Cl. .................. 709/225; 709/224; 709/217; 709/204; 718/1; 705/37
(58) Field of Classification Search ............. 709/224, 709/218, 217, 204, 225; 395/182; 718/1; 705/36, 37
See application file for complete search history.

(56) References Cited

U.S. PATENT DOCUMENTS

| 4,905,171 A | 2/1990 | Kiel et al. ............ 364/551.01 |
| 5,408,618 A | 4/1995 | Aho et al. .................. 395/325 |
| 5,627,766 A | 5/1997 | Beaven ................. 364/551.01 |

(Continued)

FOREIGN PATENT DOCUMENTS

GB 2357679 A * 6/2001

OTHER PUBLICATIONS

U.S. Patent Application, "Apparatus, Method, and Business Method for Enabling Customer Access to Computer System Performance Data in Exchange for Sharing the Performance Data," U.S. Appl. No. 09/892,424, filed Jun. 27, 2001.

(Continued)

*Primary Examiner*—Larry D Donaghue
*Assistant Examiner*—Asghar Bilgrami
(74) *Attorney, Agent, or Firm*—Martin & Associates, LLC; Bret J. Petersen (57) ABSTRACT

An apparatus, method, and business method allow a customer to access execution data only if transmission of the execution data to the vendor is enabled. In a first embodiment, the customer cannot access any execution data unless transmission of the execution data to the vendor is enabled. In a second embodiment, the customer can access some limited execution data, but cannot access more extensive execution data unless transmission of the execution data to the vendor is enabled. The preferred embodiments provide the capability of a customer accessing historical execution data in exchange for the customer transmitting the execution data to the vendor. In this manner the needs of both vendor and customer are satisfied.

25 Claims, 6 Drawing Sheets

U.S. PATENT DOCUMENTS

| | | | |
|---|---|---|---|
| 5,696,701 A | 12/1997 | Burgess et al. | 364/551.01 |
| 5,704,031 A * | 12/1997 | Mikami et al. | 714/4 |
| 5,758,071 A | 5/1998 | Burgess et al. | 395/200.5 |
| 5,796,633 A | 8/1998 | Burgess et al. | 364/551.01 |
| 5,826,000 A | 10/1998 | Hamilton | |
| 5,828,899 A | 10/1998 | Richard et al. | |
| 5,845,077 A | 12/1998 | Fawcett | |
| 5,848,231 A | 12/1998 | Teitelbaum et al. | |
| 5,901,312 A * | 5/1999 | Radko | 718/104 |
| 5,918,019 A | 6/1999 | Valencia | |
| 5,926,624 A | 7/1999 | Katz et al. | |
| 5,930,357 A | 7/1999 | Fukui | |
| 5,949,976 A | 9/1999 | Chappelle | 395/200.54 |
| 5,961,596 A | 10/1999 | Takubo et al. | 709/224 |
| 6,098,098 A | 8/2000 | Sandahl et al. | |
| 6,130,892 A | 10/2000 | Short et al. | |
| 6,138,249 A | 10/2000 | Nolet | |
| 6,170,060 B1 | 1/2001 | Mott et al. | |
| 6,247,128 B1 | 6/2001 | Fisher et al. | |
| 6,289,462 B1 | 9/2001 | McNabb et al. | |
| 6,321,338 B1 | 11/2001 | Porras et al. | |
| 6,425,126 B1 | 7/2002 | Branson et al. | |
| 6,510,463 B1 * | 1/2003 | Farhat et al. | 709/224 |
| 6,591,418 B2 | 7/2003 | Bryan et al. | |
| 6,615,182 B1 * | 9/2003 | Powers et al. | 705/7 |
| 6,643,654 B1 | 11/2003 | Patel et al. | |
| 6,645,077 B2 | 11/2003 | Rowe | |
| 6,654,891 B1 | 11/2003 | Borsato et al. | |
| 6,708,155 B1 | 3/2004 | Honarvar et al. | |
| 6,714,976 B1 * | 3/2004 | Wilson et al. | 709/224 |
| 6,775,699 B1 | 8/2004 | DeLuca et al. | |
| 6,792,455 B1 | 9/2004 | DeLuca et al. | |
| 6,798,997 B1 | 9/2004 | Hayward et al. | |
| 6,813,248 B1 | 11/2004 | Boss et al. | |
| 7,146,336 B2 * | 12/2006 | Olsen et al. | 705/37 |
| 2001/0029526 A1 * | 10/2001 | Yokoyama et al. | 709/218 |
| 2002/0052947 A1 | 5/2002 | Duimovich et al. | |
| 2002/0099812 A1 * | 7/2002 | Davis et al. | 709/224 |
| 2002/0129356 A1 | 9/2002 | Hellerstein et al. | |
| 2002/0147757 A1 * | 10/2002 | Day et al. | 709/1 |
| 2002/0156884 A1 | 10/2002 | Bertram et al. | |
| 2002/0188941 A1 | 12/2002 | Cicciarelli et al. | |
| 2003/0009385 A1 * | 1/2003 | Tucciarone et al. | 705/26 |
| 2004/0122730 A1 * | 6/2004 | Tucciarone et al. | 705/14 |

OTHER PUBLICATIONS

U.S. Patent Application, "Method and Apparatus for Automating Software Upgrades," U.S. Appl. No. 09/912,975, filed Jul. 25, 2001.

U.S. Patent Application, "Method and Apparatus Upgrade Assistance Using Critical Historical Product Information," U.S. Appl. No. 09/865,371, filed May 25, 2001.

U.S. Patent Application, "Physical Device Placement Assistant," U.S. Appl. No. 09/865,798, filed May 25, 2001.

AS/400 Publication, "Performance Management/400 Offerings and Services, including Performance Management/400—Subset," Version 3, SC41-0145-02, Sep. 1994.

Emil Abrascid, Data Manager Online, Copyright 1999.

IBM e-business on demand: the next wave of IT Services by IBM Global Services, Jan. 2002.

* cited by examiner

APPARATUS, METHOD, AND BUSINESS METHOD FOR ENABLING CUSTOMER ACCESS TO COMPUTER SYSTEM EXECUTION DATA IN EXCHANGE FOR SHARING THE EXECUTION DATA

RELATED APPLICATION

This patent application is related to a concurrently filed U.S. patent application, "Apparatus, Method, and Business Method for Enabling Customer Access to Computer System Performance Data in Exchange for Sharing the Performance Data" Ser. No. 09/892,424, filed on Jun. 27, 2001.

BACKGROUND OF THE INVENTION

1. Technical Field

This invention generally relates to the data processing field, and more specifically relates to the gathering and monitoring of data in a computer system relating to the execution of the computer system.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor.

The performance of a computer system depends on many factors that are determined by hardware, software, and other dynamic considerations such as total number of programs being processed, network traffic load, cache efficiency, etc. The performance of computer systems is of great interest to customers that purchase and depend on these computer systems. In addition, the performance of these computer systems is also of interest to the computer system vendor to determine whether the performance could be improved by selling additional hardware, software, or services to the customer to better meet the customer's needs.

Current operating systems collect performance data as a computer runs. In addition, application software may collect data while a computer is executing the software. For example, a database program may collect statistics relating to the database as queries are made to the database. Some known operating systems provide unrestricted customer access to performance data, allowing the customer to view the performance data historically for a defined period, such as the past six months. Some application software show data relating to the execution of the software to the user. Providing the customer with unrestricted access to the performance and other execution data for the customer's computer systems may result in a loss of marketing opportunity for the computer system vendor. For example, if the execution data indicates that disk utilization is high, the customer may purchase a new disk drive from a different vendor rather than from the vendor that sold the customer the computer system. In addition, unrestricted access by the customer to the execution data without fee eliminates an opportunity to sell reports and analysis services to the customers. Without a way to strike a balance between the customer's need to analyze execution data and the vendor's need to collect the execution data from the customer, the needs of both vendors and customers will continue to be unsatisfied.

DISCLOSURE OF INVENTION

According to the preferred embodiments, an apparatus, method, and business method allow a customer to access execution data only if transmission of the execution data to the vendor is enabled. In a first embodiment, the customer cannot access any execution data unless transmission of the execution data to the vendor is enabled. In a second embodiment, the customer can access some limited execution data, but cannot access more extensive execution data unless transmission of the execution data to the vendor is enabled. The preferred embodiments provide the capability of a customer accessing historical execution data in exchange for the customer transmitting the execution data to the vendor. In this manner the needs of both vendor and customer are satisfied.

The foregoing and other features and advantages of the invention will be apparent from the following more particular description of preferred embodiments of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

An apparatus, method, and business method in accordance with the preferred embodiments allows a customer to access execution data collected on the customer's computer system in exchange for transmitting the collected execution data to the vendor. In one embodiment, no access to execution data by the customer is allowed unless transmission of the execution data is enabled to the vendor. In a second embodiment, limited access by the customer is allowed, but if more extensive access is needed, the customer must enable transmission of the execution data to the vendor in order to receive the extensive access to execution data.

Vendors have a great interest in accessing execution data for their customer's computer systems because this execution data may allow selling other products to the customers, such as additional hardware if resources are constrained, additional software if performance improvements can be realized, or services such as reports and analysis of the execution data. In the prior art, vendors are left with the untenable dilemma of whether to allow unrestricted access to execution data by customers, thereby losing marketing opportunities, or to allow no access or very limited access to execution data, thereby frustrating customers that need to access and analyze more extensive execution data. The preferred embodiments solves this dilemma by providing a method for allowing extensive access to execution data by the customer only if the customer enables transmission of the execution data to the vendor. In this manner, both vendor and client get what they need, namely access to the execution data for their own business purposes.

Figure 1:
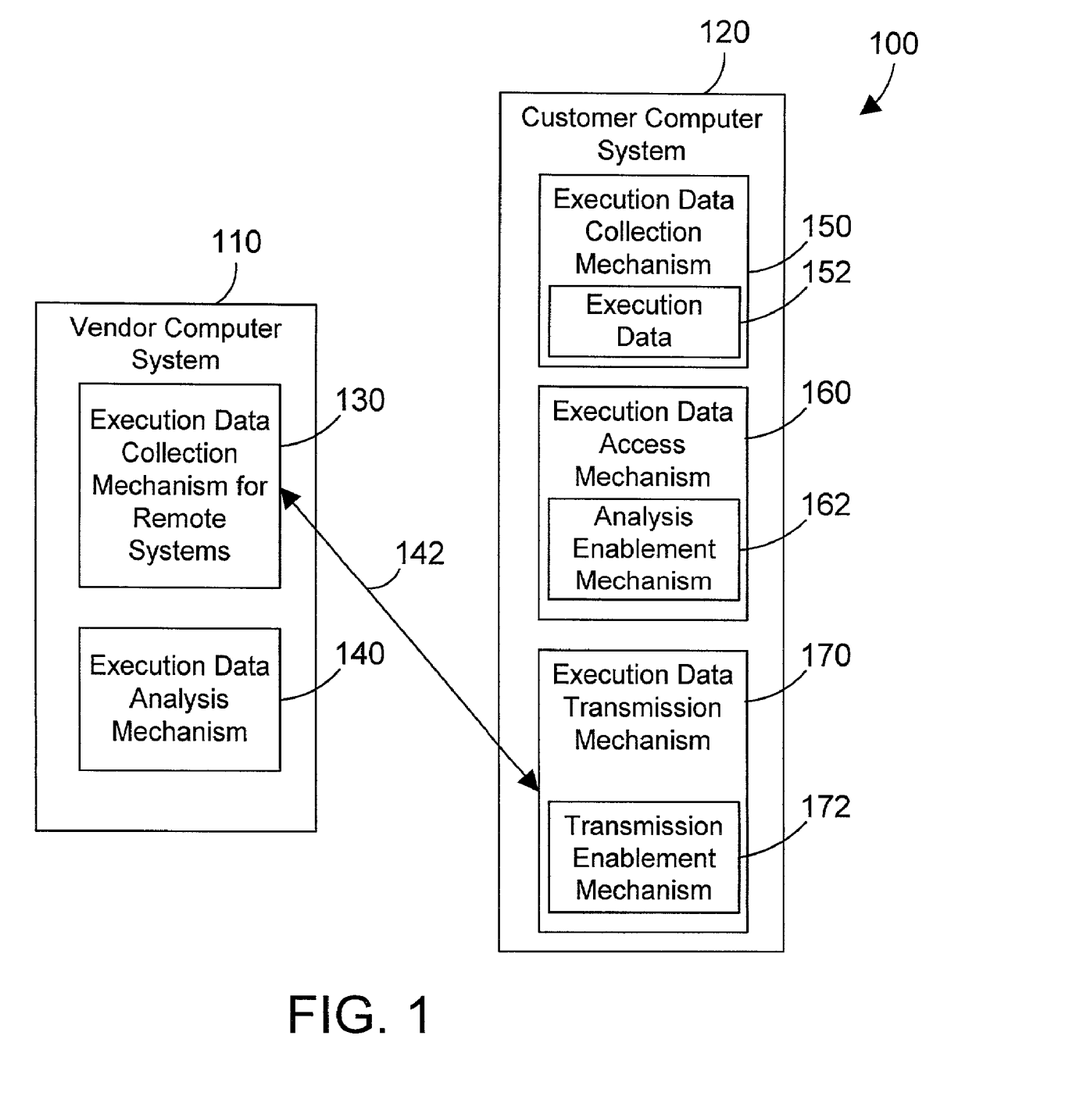
FIG. 1 is a block diagram showing a vendor computer system and a customer computer system in accordance with the preferred embodiments.

Referring to FIG. 1, a vendor computer system 110 is coupled to a customer computer system 120. The vendor computer system 110 includes an execution data collection mechanism for remote systems 130, and an execution data analysis mechanism 140. Execution data collection mechanism 130 is a mechanism that collects execution data from a customer computer system, while execution data analysis mechanism 140 is used to analyze the data to determine if the customer may need additional products from the vendor (e.g., hardware, software, services). Note that the term "execution data" as used herein is a very broad term that can include anything that can be measured as the computer system runs or after it runs. One example of execution data is performance data collected by an operating system. Examples of certain performance data include CPU utilization, available memory, cache hit ratio, response time, disk utilization, I/O rate, LAN utilization, etc. Another example of execution data is customer buying patterns on a web site. Yet another example of execution data is data that is gathered by an automotive computer as the automobile runs. Another example of execution data is data that is gathered by an analysis program after an event has occurred to measure the performance of a past event. For example, if memory usage during the execution of a software application needs to be measured, the memory usage may be stored periodically into defined memory locations as the application runs. An analysis program can then read the memory usage from the memory after the application is finished running using an analysis program to retrieve the memory usage data. The preferred embodiments herein extend to virtually any type of data that may be collected while a computer system runs, whether the data is collected real-time as the computer system is executing a particular task, or whether the data is collected after the task has completed running.

Customer computer system 120 includes an execution data collection mechanism 150, an execution data access mechanism 160, and an execution data transmission mechanism 170. Execution data collection mechanism 150 collects execution data 152 as the customer computer system 120 runs, and logs the execution data 152 for future access. Execution data access mechanism 160 controls access to the execution data 152 by the customer. In the preferred embodiments, execution data access mechanism 160 includes an access enablement mechanism 162 that determines whether or not the user will be able to access the execution data 152 collected by the execution data collection mechanism 150. In a first embodiment, if the access enablement mechanism 162 is enabled, the user will be able to access the execution data. If the access enablement mechanism 162 is disabled, the user will not be able to access the execution data. In a second embodiment, if the access enablement mechanism 162 is enabled, the user will be able to access all of the execution data. If the access enablement mechanism 162 is disabled, the user will only be able to access a limited portion of the execution data.

The execution data transmission mechanism 170 transmits execution data to the execution data collection mechanism for remote systems 130 in the vendor computer system 110 via some kind of network connection 142. In the preferred embodiments, execution data transmission mechanism 170 includes a transmission enablement mechanism 172 that determines whether the customer will allow transmission of the execution data to the vendor. If the transmission enablement mechanism 172 is enabled, the execution data transmission mechanism 170 will transmit the execution data 152 to the vendor computer system 110. If the transmission enablement mechanism 172 is disabled, the execution data transmission mechanism 170 will not transmit the execution data 152 to the vendor computer system 110.

In the preferred embodiments, the state of the access enablement mechanism 162 depends directly on the state of the transmission enablement mechanism 172. If the transmission enablement mechanism 172 is enabled, the access enablement mechanism 162 will also be enabled. If the transmission enablement mechanism 172 is disabled, the access enablement mechanism 162 will also be disabled. Thus, if a customer agrees to share the execution data with the vendor by enabling the transmission enablement mechanism 172, the customer gains access to the execution data via execution data access mechanism 160. In this manner, the vendor gains access to the customer's execution data 152 in exchange for the customer gaining the ability to access (and therefore analyze) the execution data 152. Note that the business method of the preferred embodiments includes any type of compensation in either direction between the vendor and the customer. In one scenario, the customer would pay for a software product sold by the vendor that includes the execution data access mechanism 160 and associated software for analyzing the execution data. The execution data access mechanism 160 would then assure that transmission of the execution data to the vendor is enabled before allowing access and analysis of the execution data 152. In another scenario, the customer's execution data may be so valuable that the vendor may supply the execution data access mechanism 160 to the customer for free, or may pay the customer for sharing the execution data. Whatever the specifics of the arrangement between vendor and customer, if the transmission of the execution data to the vendor is enabled, the customer will be given enhanced access to the execution data 152 collected on the customer's computer system.

Figure 2:
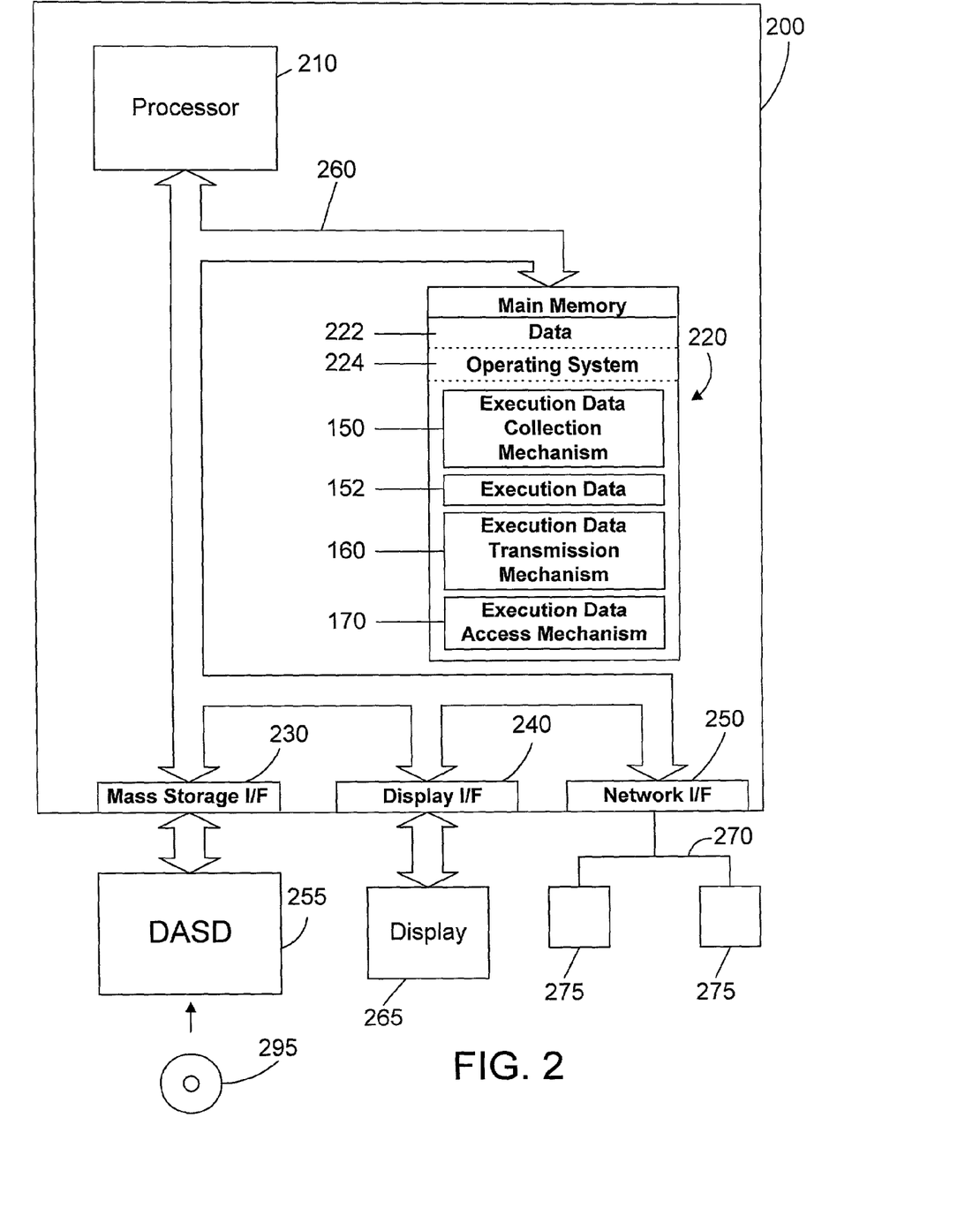
FIG. 2 is a block diagram of one specific implementation of customer computer system 120 of FIG. 1 in accordance with the preferred embodiments.

Referring now to FIG. 2, a computer system 200 in accordance with the preferred embodiment is an IBM iSeries computer system. However, those skilled in the art will appreciate that the mechanisms and apparatus of the present invention apply equally to any computer system, regardless of whether the computer system is a complicated multi-user computing apparatus. a single user workstation, or an embedded control system. Computer system 200 is one suitable implementation for customer computer system 120 in FIG. 1. As shown in FIG. 2, computer system 200 comprises a processor 210, a main memory 220, a mass storage interface 230, a display interface 240, and a network interface 250. These system components are interconnected through the use of a system bus 260. Mass storage interface 230 is used to connect mass storage devices (such as a direct access storage device 255) to computer system 200. One specific type of direct access storage device 255 is a readable and writable CD ROM drive, which may store data to and read data from a CD ROM 295.

Main memory 220 in accordance with the preferred embodiments contains data 222, an operating system 224, execution data collection mechanism 150, execution data 152, execution data access mechanism 160, and execution data transmission mechanism 170. Note that execution data collection mechanism 150, execution data 152, execution data access mechanism 160, and execution data transmission mechanism 170 are discussed above with reference to FIG. 1. While the execution data collection mechanism 150, execution data 152, execution data access mechanism 160, and execution data transmission mechanism 170 are shown separate and discrete from operating system 224 in FIG. 2, the preferred embodiments expressly extend to any or all of mechanisms 150, 160 and 170 being implemented within the operating system 224. In one, execution data collection mechanism 150 is part of the operating system 224 because the operating system 224 already collects performance data, and could easily collect other types of execution data as well. Execution data access mechanism 160 and execution data transmission mechanism 170 could also be implemented within the operating system 224, or could be supplied as separate programs. In addition, any or all of these mechanisms 150, 160 and 170 could be implemented in application software, utilities, or other types of software within the scope of the preferred embodiments. Note also that the functions of these three mechanisms 150, 160 and 170 could be appropriately split out or combined within the scope of the preferred embodiments to arrive a single computer program or any suitable number of computer programs that perform the functions described herein within the scope of the preferred embodiments.

Computer system 200 utilizes well known virtual addressing mechanisms that allow the programs of computer system 200 to behave as if they only have access to a large, single storage entity instead of access to multiple, smaller storage entities such as main memory 220 and DASD device 255. Therefore, while data 222, operating system 224, execution data collection mechanism 150, execution data 152, execution data access mechanism 160, and execution data transmission mechanism 170 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Data 222 represents any data that serves as input to or output from any program in computer system 200. Operating system 224 is a multitasking operating system known in the industry as OS/400; however, those skilled in the art will appreciate that the spirit and scope of the present invention is not limited to any one operating system.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, display interface 240, network interface 250, and system bus 260.

Although computer system 200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 210. However, those skilled in the art will appreciate that the present invention applies equally to computer systems that simply use I/O adapters to perform similar functions.

Display interface 240 is used to directly connect one or more displays 265 to computer system 200. These displays 265, which may be non-intelligent (i.e., dumb) terminals or fully programmable workstations, are used to allow system administrators and users to communicate with computer system 200. Note, however, that while display interface 240 is provided to support communication with one or more displays 265, computer system 200 does not necessarily require a display 265, because all needed interaction with users and other processes may occur via network interface 250.

Network interface 250 is used to connect other computer systems and/or workstations (e.g., 275 in FIG. 2) to computer system 200 across a network 270. The present invention applies equally no matter how computer system 200 may be connected to other computer systems and/or workstations, regardless of whether the network connection 270 is made using present-day analog and/or digital techniques or via some networking mechanism of the future. In addition, many different network protocols can be used to implement a network. These protocols are specialized computer programs that allow computers to communicate across network 270. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 295 of FIG. 2), and transmission type media such as digital and analog communications links.

Figure 3:
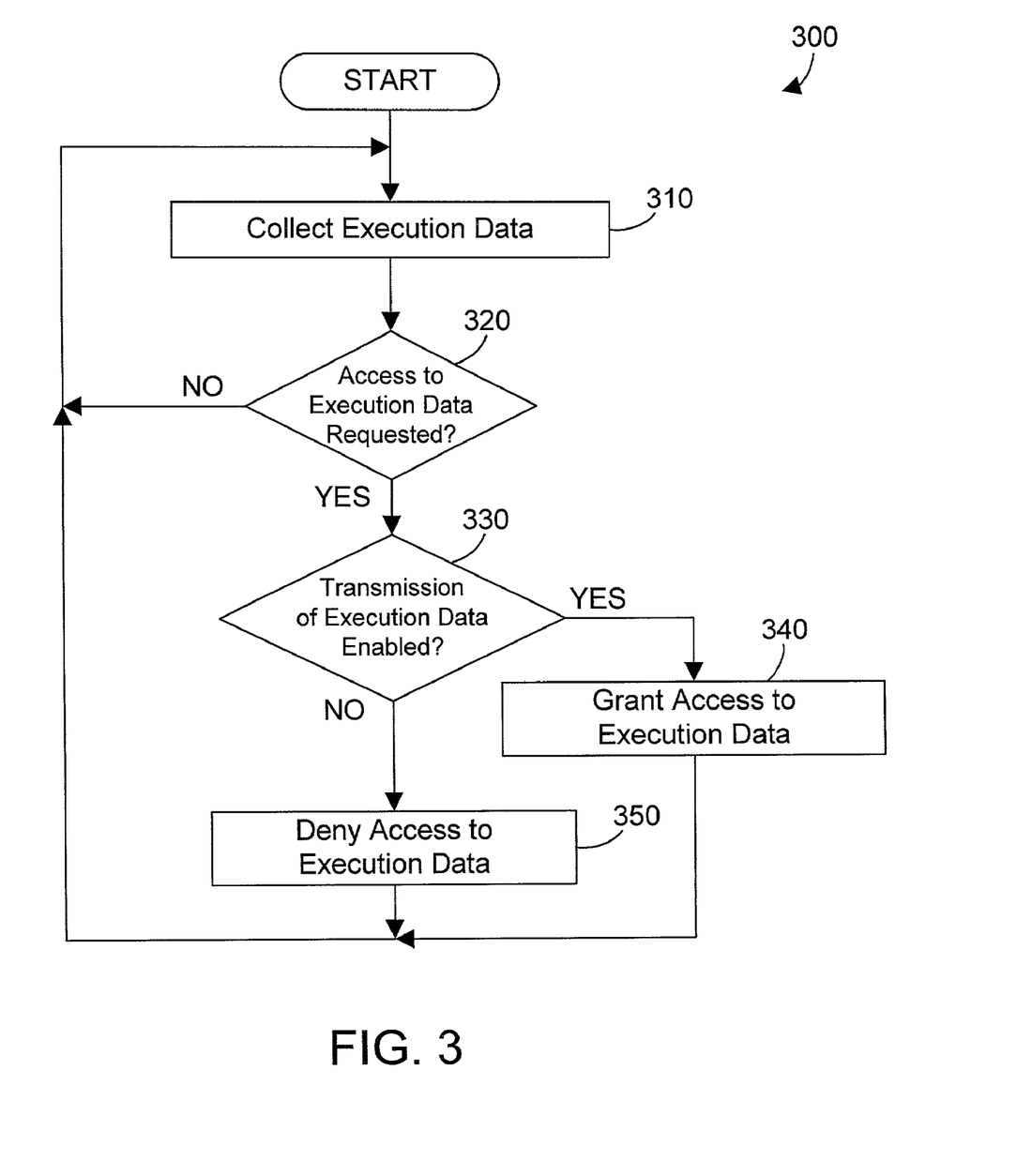
FIG. 3 is a flow diagram of a method for allowing customer access to execution data in accordance with a first embodiment.

Referring now to FIG. 3, a method 300 in accordance with a first embodiment prevents all access to execution data unless transmission of the execution data to the vendor is enabled. The customer computer system collects the execution data (step 310). If a user of the customer computer system requests access to the execution data (step 320=YES), method 300 then determines whether the transmission of the execution data is enabled (step 330). If so (step 330=YES), the user's request to access the execution data is granted (step 340). If transmission is not enabled (step 330=NO), the user's request to access the execution data is denied (step 350). In this manner the customer cannot access any execution data unless transmission of execution data to the vendor is enabled.

Figure 4:
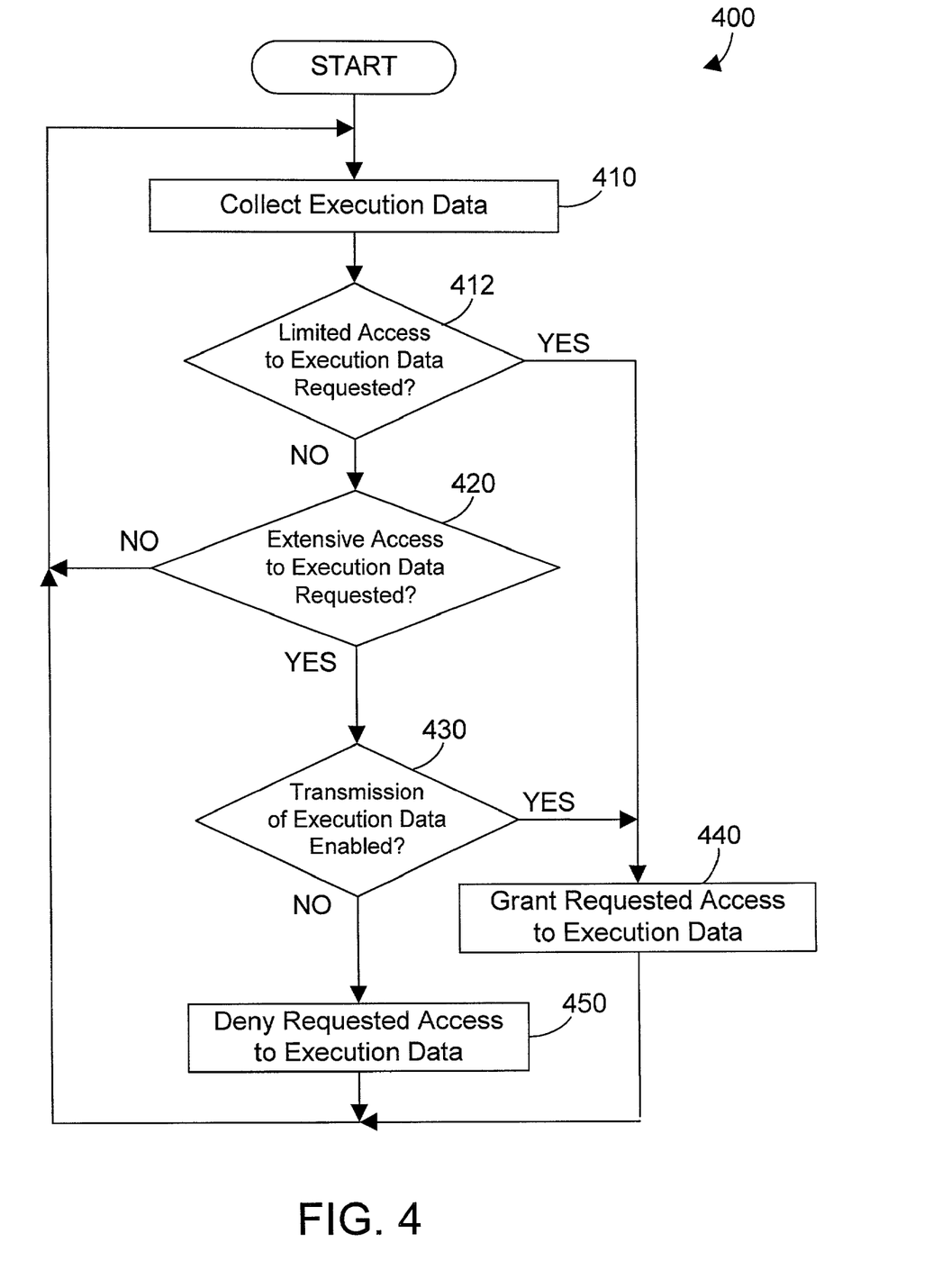
FIG. 4 is a flow diagram of a method for allowing customer access to execution data in accordance with a second embodiment.

Referring now to FIG. 4, a method 400 in accordance with a second embodiment provides limited access to execution data without regard to whether transmission of the execution data is enabled or not. More extensive access to the execution data is not allowed unless transmission of the execution data to the vendor is enabled. The customer computer system collects the execution data (step 410). If only limited access to the execution data is requested (step 412=YES), the request is granted (step 440). If limited access to the execution data is not requested (step 412=NO), method 400 then determines whether extensive access has been requested (step 420). If not (step 420=NO), method 400 loops back to step 410 and continues. If so (step 420=YES), method 400 checks to see if transmission of execution data to the vendor is enabled (step 430). If transmission to the vendor is enabled (step 430=YES), the request for extensive access is granted (step 440). If transmission to the vendor is not enabled (step 430=NO), the request for extensive access is denied (step 450).

Figure 5:
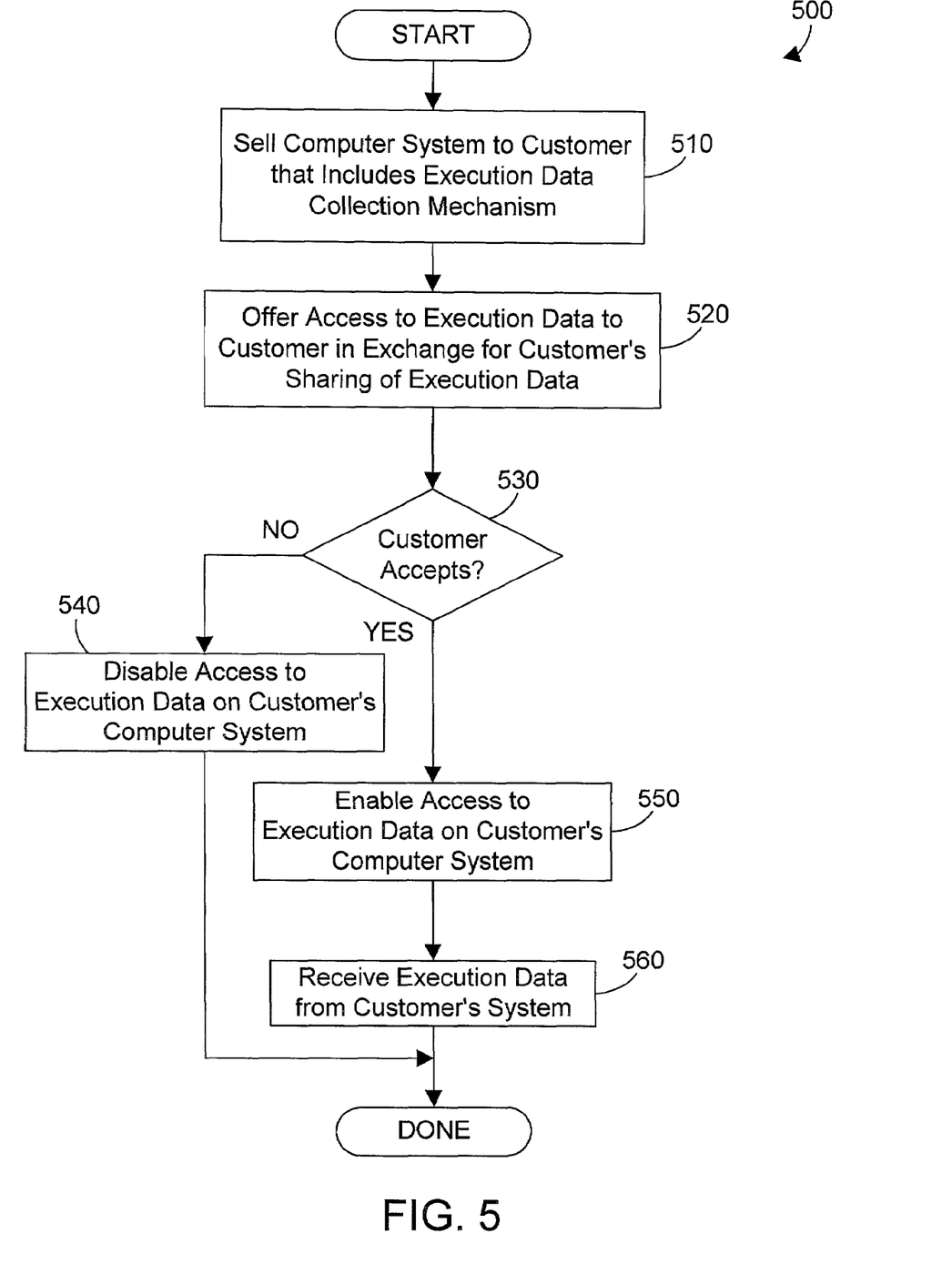
FIG. 5 is a flow diagram showing the steps in a business method in accordance with the preferred embodiments.

A business method (or method for doing business) is also within the scope of the preferred embodiments. Referring to FIG. 5, a method 500 for a computer vendor to do business begins by selling a computer system that includes the execution data collection mechanism to a customer (step 510). Next, the vendor offers access to the execution data to the customer in exchange for the customer sharing the execution data with the vendor (step 520). If the customer rejects the offer in step 520 (step 530=NO), access to the execution data on the customer's computer system is disabled (step 540). If the customer accepts the offer in step 520 (step 530=YES), access to the execution data on the customer's computer system is enabled (step 550). The vendor system will then (at some point in time) receive the execution data from the customer's computer system (step 560). The business method of the preferred embodiments strikes an effective balance between the customer's desire to access and analyze execution data with the vendor's need to receive the execution data from the customer. Note that not all steps in method 500 must be performed to practice the invention. For example, step 510 need not be performed. Instead of the vendor of the computer system receiving the execution data, a company could offer a service within the scope of the preferred embodiments that analyzes execution data gathered on a computer system sold by a different company. In this scenario, step 510 would be performed by the computer system vendor, while steps 520-560 would be performed by a different vendor that is providing the service of analyzing the execution data for the customer. Of course, other scenarios are possible within the scope of the preferred embodiments. In addition, method 500 expressly encompasses both methods 300 and 400 discussed above. In the case of method 300, step 540 disables all access to execution data, while step 550 enables all access to execution data. In the case of method 400, step 540 disables extended access to execution data but allows limited access to execution data, while step 550 enables all access to execution data.

Figure 6:
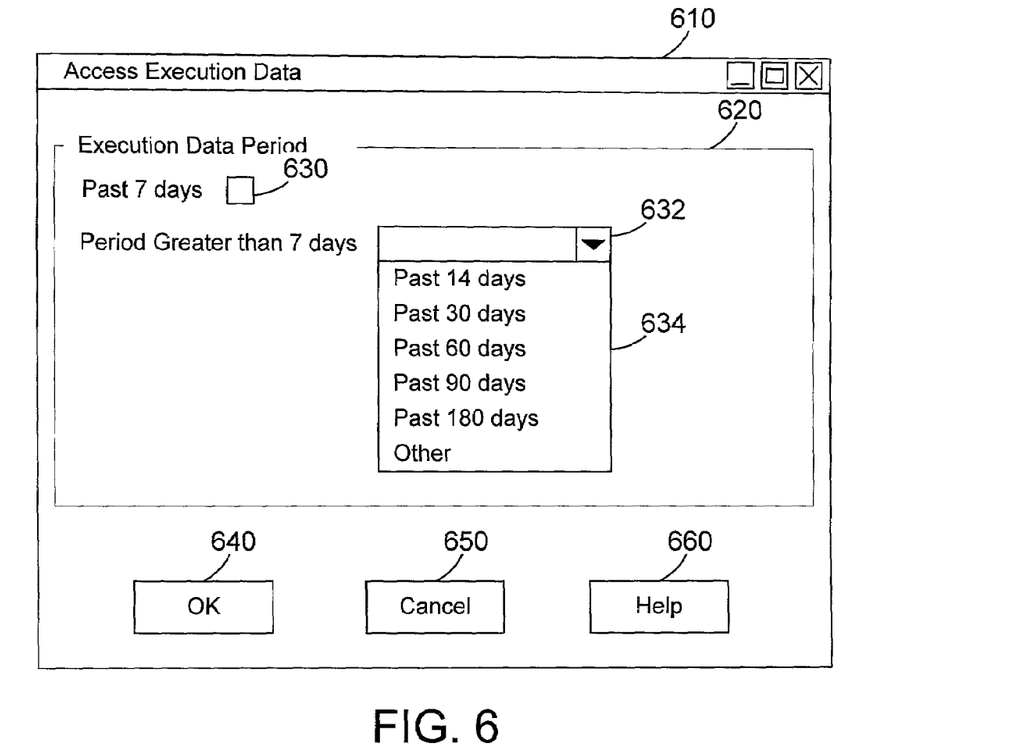
FIG. 6 is a display panel on a graphical user interface that allows a user to select a time period for which the user wants to access execution data.
Figure 7:
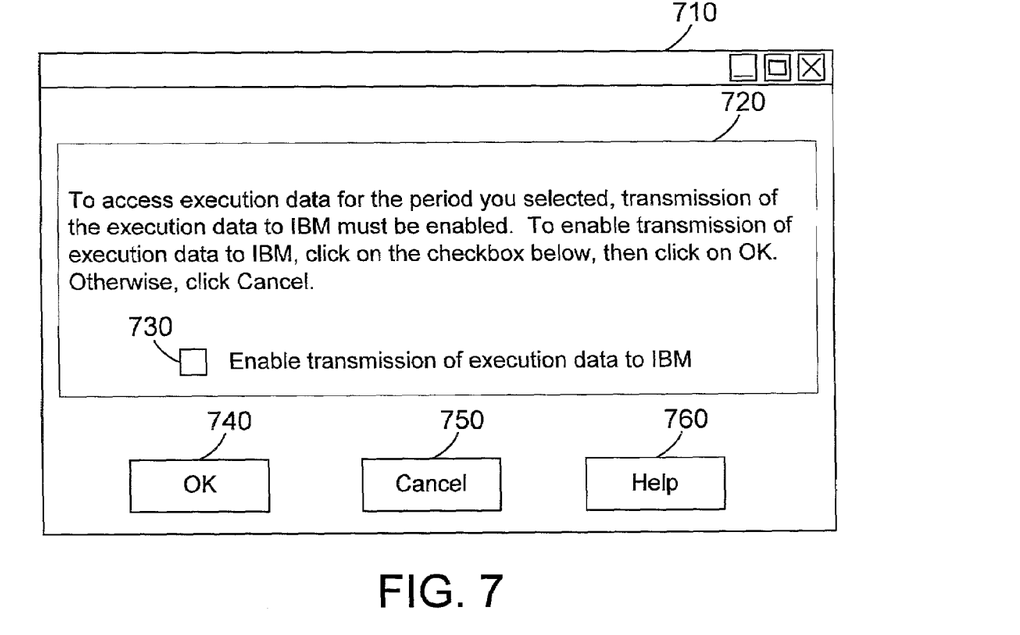
FIG. 7 is a display panel on a graphical user interface that allows a user to enable transmission of the execution data to the vendor before allowing customer access to the execution data.

Referring now to FIGS. 6 and 7, display panels on a graphical user interface are shown that allow a customer to freely access limited execution data, but that require transmission of the execution data to the vendor to be enabled before allowing customer access to extended execution data. Thus, the display panels of FIGS. 6 and 7 are one suitable implementation of certain portions of method 400 in FIG. 4. In display panel 610 of FIG. 6, a message box 620 prompts the user to select the period for which the user desires to access execution data. The user can click on the checkbox 630 that corresponds to a period of the past seven days, or the user can click on the down arrow 632, which causes a drop-down menu 634 to be displayed. A user may select the past 14 days, past 30 days, past 60 days, past 90 days, or past 180 days from the drop-down menu 634. In addition, the user may select the "Other" selection on drop-down menu 634, which causes a text entry box to be presented where the user may enter a number of days, weeks, or months. Once the user has selected the execution data period, the user clicks the OK button 640. If the user wants to exit display panel 610, the user may click the Cancel button 650. If the user needs context-sensitive help, the user may click on the Help button 660.

If the user clicks the checkbox 630 for the last seven days, the user will be given access to the limited execution data for this period. If, however, the user has selected more than seven days of execution data (i.e., extended execution data), transmission of the execution data to the vendor must be enabled. We assume for this example that the vendor is IBM, and that transmission of execution data to IBM has not yet been enabled. Thus, if the user selects any selection from drop-down menu 634, then clicks the OK button 640, a display panel 710 in FIG. 7 is presented to the user that informs the user than enabling transmission of the execution data to IBM is required in order for the user to access execution data for the specified period of time. If the user desires to enable transmission of the execution data to IBM, the user clicks on checkbox 730, then clicks on the OK button 740. If the user decides to not enable transmission of the execution data to IBM, the user clicks on the Cancel button 740. In this case, the user will not be allowed to access execution data for the requested period. Of course, if the user needs help, the user may click on the Help button 760.

In the preferred embodiments, the best mode of the invention enables access to all of the customer's execution data if transmission of all of the customer's execution data to the vendor is enabled. Note, however, that accessing a portion of the execution data by the customer and transmitting a portion of the execution data to the vendor is also within the scope of the preferred embodiments. Thus, a customer may gain access to all of the execution data by agreeing to only transmit a portion of the execution data to the vendor. In similar fashion, the customer may gain access to only a portion of the execution data by agreeing to transmit all of the execution data to the vendor. Similarly, a customer may gain access to only a portion of the execution data by agreeing to transmit a different portion of the execution data to the vendor. It is expressly understood herein that a customer's access to execution data may mean access to all or part of the execution data, and transmitting execution data to a vendor likewise means transmitting all or part of the execution data.

Customer access to execution data is discussed herein in terms of a "user" accessing the execution data on the customer's computer system. Note that the term "user" is a broad term that includes human users as well as computer programs that request access to execution data. The GUI display panels in FIGS. 6 and 7 would be useful for interacting with a human user, while interaction with a computer program user could occur without display or intervention by a human user.

The preferred embodiments described herein provide incentive for customers to share execution data for their computer systems with the computer system's vendor. By providing customer access to execution data only if transmission of the execution data is enabled, the vendor can increase the likelihood of receiving the execution data from customers, thereby providing enhanced marketing opportunities for goods and services.

The application of the present invention is vast. One example is for an operating system vendor to monitor performance data of a vendor's computer system as part of the operating system code. The customer would be allowed to view and analyze the performance data so long as transmission of the performance data to the vendor is enabled. Another example is for a database provider to monitor the performance of their database software. Statistics may be gathered as the database is accessed by various different software applications and users. If the system administrator of the database wants to view the database statistics, he or she must enable transmission of those statistics to the vendor. Needless to say, feedback from customer computer systems regarding their performance is invaluable information for the vendor, and provides additional opportunities for marketing new products and services to the customer.

Another example of the present invention is for an automotive computer that gathers and stores data relating to the performance of an automobile. A service technician may be given access to the historical performance data only if transmission to the car manufacturer is enabled. In this case, the car manufacturer may require receipt of the performance data before the technician is allowed to view the performance data. Again, feedback from products in actual operation in the field would be extremely valuable to car manufacturers, and would help identify where improvements could be made.

Yet another example of the present invention is for a web site that markets products to consumers. Let's assume that before a person can buy products on the web site, they are required to "register" with the web site, which includes personal information, such as name, address, city, state, sex, marital status, age, etc. The vendor of e-commerce software running on the web site could provide a tool that analyzes information in the database to determine customer buying patterns, demographical information, gender and age tendencies, etc. This information would also be quite valuable to know how to improve the web site and product offerings to increase sales. For example, if the buying statistics show that 65% of the buyers are women between the ages of 30 and 50, more products that target women in this age group could be added. If many buyers use e-coupons, the web site could offer more coupon deals to stimulate sales. Note that execution data about the web site could be gathered in any suitable way. The execution data could be gathered by the web site software itself. The execution data could be generated by a software tool (e.g., analysis program) that performs data mining operations on a database to determine the execution data, or that analyzes information stored by the web site software relating to its execution. Execution data could be generated (or gathered) by a software application that runs concurrently with the web site e-commerce software. The preferred embodiments of the present invention extend to any suitable way to collect or generate any data relating to the execution of any type of computer system.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, the preferred embodiments expressly extend to any type of computer system, from large mainframe computer systems to the smallest microcontroller in an embedded application (such as an automotive computer).

What is claimed is:

1. A computer system comprising:
    at least one processor;
    a memory coupled to the at least one processor;
    an execution data collection mechanism residing in the memory and executed by the at least one processor, the execution data collection mechanism collecting execution data for the computer system;
    an execution data transmission mechanism residing in the memory and executed by the at least one processor, the execution data transmission mechanism, when enabled, transmitting at least a portion of the execution data to another computer system coupled to the computer system via a network; and
    an execution data access mechanism residing in the memory and executed by the at least one processor, the execution data access mechanism allowing access to the execution data by a user of the computer system only if the execution data transmission mechanism is enabled.

2. The computer system of claim 1 wherein the computer system comprises a customer computer system and the another computer system comprises a vendor computer system.

3. The computer system of claim 1 wherein the execution data comprises data collected by an operating system residing in the memory and executed by the at least one processor.

4. The computer system of claim 1 wherein the execution data comprises data collected by a software application residing in the memory and executed by the at least one processor.

5. The computer system of claim 1 wherein the execution data comprises data collected by an analysis program residing in the memory and executed by the at least one processor.

6. A networked computer system comprising:
    (A) a first computer system;
    (B) a second computer system coupled to the first computer system via a network, the second computer system comprising:
        (B1) an execution data collection mechanism that collects execution data for the second computer system;
        (B2) an execution data transmission mechanism that, when enabled, transmits at least a portion of the execution data to the first computer system; and
        (B3) an execution data access mechanism that allows access to the execution data by a user of the second computer system only if the execution data transmission mechanism is enabled.

7. The networked computer system of claim 6 wherein the first computer system comprises a vendor computer system and the second computer system comprises a customer computer system.

8. The networked computer system of claim 6 wherein the execution data comprises data collected by an operating system.

9. The networked computer system of claim 6 wherein the execution data comprises data collected by a software application.

10. The networked computer system of claim 6 wherein the execution data comprises data collected by an analysis program.

11. A method for a user of a second computer system coupled via a network to a first computer system to access execution data collected by the second computer system, the method comprising the steps of:
    (A) the second computer system collecting the execution data;
    (B) the second computer system determining whether transmission of the execution data from the second computer system to the first computer system is enabled;
    (C) if transmission of the execution data from the second computer system to the first computer system is enabled, allowing the user to access the execution data; and (D) if transmission of the execution data from the second computer system to the first computer system is not enabled, not allowing the user to access the execution data.

12. A method for a first computer system to collect execution data from a second computer system coupled via a network to the first computer system, the method comprising the steps of:
   (A) the second computer system collecting the execution data;
   (B) the second computer system determining whether transmission of the execution data from the second computer system to the first computer system is enabled;
   (C) if transmission of the execution data from the second computer system to the first computer system is enabled, allowing access to the execution data by a user of the second computer system;
   (D) if transmission of the execution data from the second computer system to the first computer system is not enabled, not allowing access to the execution data by a user of the second computer system; and
   (E) the second computer system transmitting at least a portion of the execution data to the first computer system.

13. A method for a user of a second computer system coupled via a network to a first computer system to access execution data collected by the second computer system, the method comprising the steps of:
   (A) the second computer system collecting the execution data;
   (B) the second computer system allowing the user to access a limited portion of the execution data;
   (C) if the user requests to access more than the limited portion of the execution data:
      (C1) the second computer system determining whether transmission of the execution data from the second computer system to the first computer system is enabled;
      (C2) if transmission of the execution data from the second computer system to the first computer system is enabled, allowing the user to access the requested execution data; and
      (C3) if transmission of the execution data from the second computer system to the first computer system is not enabled, not allowing the user to access the requested execution data.

14. A method for a first computer system to collect execution data from a second computer system coupled via a network to the first computer system, the method comprising the steps of:
   (A) the second computer system collecting the execution data;
   (B) the second computer system allowing the user to access a limited portion of the execution data;
   (C) if the user requests to access more than the limited portion of the execution data:
      (C1) the second computer system determining whether transmission of the execution data from the second computer system to the first computer system is enabled;
      (C2) if transmission of the execution data from the second computer system to the first computer system is enabled, allowing access to the requested execution data by a user of the second computer system;
      (C3) if transmission of the execution data from the second computer system to the first computer system is not enabled, not allowing access to the requested execution data by a user of the second computer system; and
      (C4) the second computer system transmitting at least a portion of the execution data to the first computer system.

15. A method for doing business comprising the steps of:
   (A) a vendor offering to a customer the ability to access execution data gathered by a customer computer system in exchange for the customer's transmitting of the execution data to the vendor;
   (B) if the customer does not accept the offer in (A), disabling customer access to the execution data on the customer computer system;
   (C) if the customer accepts the offer in (A), enabling customer access to the execution data on the customer computer system.

16. The method of claim 15 further comprising the step of:
   (D) the customer computer system sharing the execution data.

17. The method of claim 15 further comprising the step of: selling the customer computer system to the customer.

18. A program product comprising:
   (A) an execution data collection mechanism that collects execution data for a first computer system;
   (B) an execution data transmission mechanism that, when enabled, transmits at least a portion of the execution data to a second computer system;
   (C) an execution data access mechanism that allows access to the execution data only if the execution data transmission mechanism is enabled; and
   (D) computer recordable media bearing (A), (B) and (C).

19. The program product of claim 18 wherein the execution data comprises data collected by an operating system.

20. The program product of claim 18 wherein the execution data comprises data collected by a software application.

21. The program product of claim 18 wherein the execution data comprises data collected by an analysis program.

22. A program product comprising:
   (A) an operating system comprising:
      (A1) an execution data collection mechanism that collects execution data for a first computer system;
      (A2) an execution data transmission mechanism that, when enabled, transmits at least a portion of the execution data to a second computer system;
      (A3) an execution data access mechanism that allows access to the execution data only if the execution data transmission mechanism is enabled; and
   (B) computer recordable media bearing the operating system.

23. The program product of claim 22 wherein the execution data comprises data collected by an operating system.

24. The program product of claim 22 wherein the execution data comprises data collected by a software application.

25. The program product of claim 22 wherein the execution data comprises data collected by an analysis program.

* * * * *

UNITED STATES PATENT AND TRADEMARK OFFICE
CERTIFICATE OF CORRECTION

PATENT NO.       : 7,596,617 B2                                    Page 1 of 1
APPLICATION NO.  : 09/892435
DATED            : September 29, 2009
INVENTOR(S)      : Bartley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2483 days.

Signed and Sealed this

Twenty-eighth Day of September, 2010

David J. Kappos
*Director of the United States Patent and Trademark Office*